United States Patent
Harris

[15] 3,679,288
[45] July 25, 1972

[54] TUNABLE ACOUSTO-OPTIC METHOD AND APPARATUS

[72] Inventor: Stephen E. Harris, Palo Alto, Calif.
[73] Assignee: Chromatix, Inc.
[22] Filed: Nov. 13, 1970
[21] Appl. No.: 89,379

Related U.S. Application Data

[63] Continuation of Ser. No. 820,873, May 1, 1969, abandoned.

[52] U.S. Cl............................350/149, 250/199, 350/147, 350/157, 350/161
[51] Int. Cl.......................................................G02f 1/24
[58] Field of Search..........350/147, 149, 150, 157, 160–161; 250/199

[56] References Cited

UNITED STATES PATENTS

3,439,974  4/1969  Henry et al. ...........................350/157

OTHER PUBLICATIONS

Dixon, " Acoustic Diffraction of Light in Anisotropic Media" J. Quant. Elect. Vol. QE–3, No. 2 (Feb. 1967) pp. 85–93.
Lean et al., " Efficient Microwave Shear–Wave Generation by Mode Conversion" Appl. Phys. Lett. Vol. 9, No. 10 (Nov. 15, 1966) pp. 372–374.
Dixon et al., " New Technique for Measuring Photoelastic Tensors and Application to Lithium Niobate" Appl. Phys. Lett. Vol. 8, No. 8 (Apr. 15, 1966) pp. 205–207.
Harris et al., " Acousto–Optic Tunable Filter" J.O.S.A. Vol. 59, No. 6 (June 1969) pp. 744–747.

Primary Examiner—David Schonberg
Assistant Examiner—Paul R. Miller
Attorney—Flehr, Hohbach, Test, Albritton & Herbert

[57] ABSTRACT

Polarized light waves propagate collinearly with acoustical waves in an optically anisotropic media. For nearly matched momentum vectors of the ordinary optical wave, extraordinary optical wave, and acoustic wave, diffraction of light into the orthogonal polarization occurs in a bandwidth determined by the birefringence and length of the media. The diffracted light may be selected by an output analyzer to form a band-pass filter. The operating point of the filter is varied by varying the frequency of the applied acoustical waves. A theory of operation is set forth together with example embodiments.

54 Claims, 8 Drawing Figures

PATENTED JUL 25 1972 3,679,288

INVENTOR.
STEPHEN E. HARRIS

BY Flehr, Hohbach, Test,
Albritton and Herbert
ATTORNEYS

INVENTOR.
STEPHEN E. HARRIS

TUNABLE ACOUSTO-OPTIC METHOD AND APPARATUS

CROSS-REFERENCE TO RELATED APPLICATION

This application is a continuation of copending application Ser. No. 820,873, filed May 1, 1969, entitled "Tunable Optical Filter", now abandoned, and assigned to the same assignee as the present invention, such parent application now abandoned in favor of the present application.

The invention described herein was made in the performance of work under a NASA contract and is subject to the provisions of Section 3 of the National Aeronautics and Space Act of 1958, Public Law 85–568 (72 Stat. 435; 42 U.S.C. 2457).

BACKGROUND OF THE INVENTION

The present invention relates to optical filters and more particularly to a new type of electronically tunable acousto-optic device which utilizes collinear acousto-optic diffraction in an optically anisotropic media.

Heretofore, generally available optical filters have been limited in their ability to rapidly change their frequency of operation. Tunable mechanical optical devices using interference films or layers are known but require the physical movement of mechanical elements as by revolving a wheel-like device or the like. Many applications such as in the bandpass filters used with lasers, which may themselves be tunable, require that such filters be readily tunable and simultaneously have a suitably narrow bandwidth. Particularly there is a need for an optical filter which is tunable in response to varying the frequency of an easily controlled electric signal.

In general, it is an object of the present invention to provide a tunable optical filter which will overcome the above mentioned limitations and disadvantages and for which the pass band may be tuned in response to varying the frequency of an applied electrical signal.

It is known that an acoustic wave travelling in a solid or liquid induces a strain which can change the refractive index of the media and diffract a light beam which is incident on the media. In isotropic media the diffracted light is generally unchanged in polarization and the diffraction is found to be particularly strong when the light is incident at the Bragg angle. Generally, when an acoustical wave interacts with an optical wave travelling at an angle to each other in an isotropic media, the acoustic wave perturbs the refractive index of the material and as a result a certain fraction of the optical energy is scattered off in a particular direction. Most acousto-optic reactions make use of the Bragg angle for which scattering effect is most enhanced.

Heretofore, an experiment was conducted and reported by R. W. Dixon in The IEEE Journal of Quantum Electronics, Volume QE-3, No. 2, of February 1967, at pages 85–93, wherein an extremely narrow band, i.e., less than one-tenth A, coherent light beam from a laser was collinearly diffracted on an acoustic wave within optically anisotropic birefringent media, namely, $\alpha$ quartz and alumina crystals. It was discovered and reported that when the frequency of the acoustic wave was at a certain frequency related to the optical frequency of the light to be diffracted that a phase-matched cumulative collinear diffraction occurred which caused the laser beam, which was polarized in a first linear direction, to be collinearly diffracted from the first polarization into a second polarization which was orthogonal to the first polarization.

The experimental apparatus consisted of a laser with an extremely narrow band coherent output beam, less than one-tenth A bandwidth, which was directed through a polarizing prism into a birefringent crystal. The light beam was directed collinear with an acoustic wave. The acoustic wave was launched into the crystal from an end thereof remote from the laser via the intermediary of a fused quartz buffer rod having a cadmium sulphide acoustic transducer affixed to the remote end thereof. An optically reflective coating was provided at the interface of the buffer rod and the birefringent crystal. The linearly polarized incident light was collinearly diffracted on the acoustic wave into a polarization orthogonal to the incident polarization. The collinearly diffracted light was reflected from the remote end of the crystal and emerged from the input face of the crystal as an output diffracted beam. The diffracted beam was polarization analyzed by the polarizing prism to separate the light of the second polarization from the incident light of the first polarization.

A reduction in the cumulative diffraction was observed for departure $\Delta f$ from the acoustic frequency which gave maximum cumulative collinear diffraction. It was speculated that the device could be employed as a polarization switch. However, it was concluded that this was probably not a practical application because other available devices could perform the same function more rapidly. It was further speculated that the polarization switch could be employed inside a laser cavity as a polarization switch or as a loss modulator for producing short light pulses and that when such use was untenable the light beam might be allowed to pass straight through the switch. However, no such speculative uses or devices were shown.

The subject prior art article also describes the mechanism of the phase-matched collinear diffraction in optically anisotropic media as a special case of Bragg diffraction in which the diffracted light is diffracted into a polarization orthogonal to the polarization of the input beam.

SUMMARY OF THE INVENTION AND OBJECTS

In the present invention it has been discovered that the optical passband for collinear acousto-optic diffraction in an optically anisotropic medium is a function of the interaction length over which the optical beam is phase-matched with the acoustic wave, and is narrow band, on the order of several angstroms for typical birefringent crystals of a length comparable to the length of media previously employed by Dixon or Bragg diffraction, i.e., 5 cm. This narrow instantaneous passband characteristic was not recognized in the prior art and is found to be readily tunable over wide optical bandwidths by merely tuning the frequency of the acoustic wave over a comparable relative bandwidth. Moreover, it has been discovered that the light to be collinearly diffracted does not have to be coherent but may comprise a white light or other sources of coherent or incoherent light having a wide bandwidth. In addition, a geometry for the acousto-optic device is provided which allows straight through transmission of the diffracted light beam and which has a maximum transmission of light, within the narrow passband, of nearly 100 percent as contrasted with a maximum transmission of less than 80 percent for the prior art geometry wherein the light beam is internally reflected from a coating at the interface of the acoustic transducer with the crystal.

As used herein, "passband," "narrow band" or "instantaneous passband" means the optical bandwidth of frequencies in which there is cumulative collinear acousto-optic diffraction in the medium from the first to the second polarization with an acoustic wave of one frequency. "Tunable band" means the range of optical frequencies over which the instantaneous passband of the filter can be tuned; broadband means broader band than the instantaneous passband and includes not only the total bandwidth of the incident light but the tunable band of frequencies of such light, as well. The "passband" may cover a band of frequencies a few times less to several orders of magnitude less than the frequencies within the broad band of frequencies.

The present invention uses a particular condition disclosed by Dixon for a strong interaction between the acoustic wave and the light wave, this condition being that the sum of the momentum vectors of the incident light, $\bar{k}_e$ and the acoustic wave, $\bar{k}_a$, equals the mementum vector, $\bar{k}_0$, of the diffracted light waves. As will become apparent, the choice of subscripts is peculiar to the example which will be set forth and stands for extraordinary, acoustic and ordinary, respectively.

In the present optical filter, a birefringent crystal is used as the medium and is chosen to have an orientation such that an incident optical signal of one polarization will be diffracted into an orthogonal polarization by collinear propagation through the crystal with the acoustic beam. The condition $\bar{k}_a + \bar{k}_a = \bar{k}_o$ is also satisfied; where the subscripts 3, $a$, and $o$ stand for the extraordinary, acoustic and ordinary waves respectively. For a given acoustic frequency, only a very small range of optical frequencies are found to satisfy the above condition of match of the momentum vectors. This small range of frequencies are found to be cumulatively diffracted into the orthogonal polarization as the light beam and acoustic wave travel through the crystal. The effect is noncumulative for optical frequencies outside the narrow range, and, accordingly, incident light of other frequencies is nearly unaffected.

The filter of the present invention includes an input polarizer to define the polarization of the input beam, an output analyzer to select light having a polarization solely orthogonal to the polarization of the input beam. It also includes an electronic source for generating suitable electric signal and an electric-acoustical transducer for converting the electric signal into acoustical waves of the same frequency. The transducer is mechanically coupled to the crystal for generating acoustical waves which propagate collinearly with the direction of propagation of light waves in the crystal.

In one feature of the present invention, a beam of light which may have a relatively wide instantaneous or sequential optical bandwidth is cumulatively collinearly diffracted on an acoustic wave within an optically anisotropic medium to cumulatively diffract light of a first polarization and of a relatively narrow optical bandwidth into light of a second polarization.

In another feature of the present invention, a light beam to be diffracted enters an optically anisotropic medium on one side thereof and passes through the medium over an optical path which is generally collinear with the path of an acoustic wave to cumulatively diffract light from the first polarization into a second polarization over an optical passband, such diffracted light emerging from the side of the medium remote from the side the light beam entered the medium, whereby the maximum optical conversion to the second polarization within the passband of the device is increased to nearly 100 percent.

Another feature of the present invention is the same as any one or more of the preceding features including the additional feature of analyzing the cumulatively diffracted light beam to separate light of one of said polarizations from light of the other of said polarizations.

Another feature of the present invention is the same as any one or more of the preceding features including the additional feature of changing the frequency of the acoustic wave to obtain a related change in the optical frequency of the light which is cumulatively diffracted from the first polarization to the second polarization.

Another feature of the present invention is the provision of an acoustic transducer coupled to the optically anisotropic medium for launching an acoustic wave in such a direction as to be deflected at a boundary of the anisotropic medium from a path which is inclined to the optical path into a path which is generally collinear with the path of the light beam to be diffracted within the anisotropic medium.

These and other objects and features of the invention will become apparent from the following descriptions when taken in conjunction with the accompanying drawings.

BRIEF DESCRIPTION OF THE DRAWINGS

Referring to FIG. 1, a tunable optical filter of the present invention is shown diagrammatically and includes an input polarizer 10 which is positioned between a light source 11 and a medium 12 which, by way of example, is a birefringent crystal. The light source may be of any type such as a narrow band coherent source such as a laser or a broad band light source such as a glow discharge in a gas, or an incandescent lamp. The broad band light source may be incoherent white light or a coherent source sequentially tuned over a broad band. The light need not be confined to the visible spectrum. The input polarizer serves to pass only that light from the source which is polarized in a given orientation to provide a polarized input light beam 13. The light beam 13 enters one face of the crystal in which it propagates generally along a predetermined axis and passes out the opposite face as an output beam 14. Output beam 14 is then passed through a second polarizer or analyzer 15 which has its axis of transmission orthogonally disposed with respect to the orientation of transmission of polarizer 10.

Figure 1:
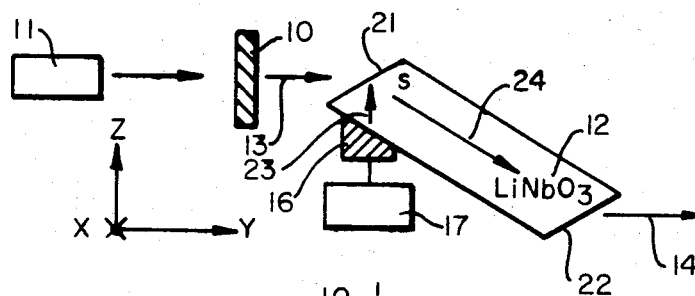
FIG. 1 is a schematic representation of a filter constructed in accordance with the present invention.

An acoustical transducer 16 is mounted in intimate contact with the crystal and is connected to a suitable signal generator or source 17 of time varying electric signals, the frequency of which can be varied. The source of electric signals, transducer and light source, as well as polarizers 10 and 15, are of such type as may be generally available and need not be further described herein, except as to frequency of operation and power requirements which will be hereinafter discussed.

The crystal 12 can, by way of example, be made of $LiNbO_3$ provided with end faces 21, 22 cut at the Brewster angle to minimize reflections. For this crystal configuration the acoustic wave is brought in as a longitudinal wave 23 which is internally reflected and converted to a shear wave 24 upon reflection from input face 21. After reflection the acoustic shear wave 24 and the input light beam 13 propagate collinearly down the Y axis of the crystal. For a particular combination of light wave and acoustic wave frequencies, there is found a strong interaction between the light and acoustic waves in which the acoustic waves diffract the light waves from the polarization orientation of the input beam into the orthogonal polarization, as a result of the $k$ vector matching condition. Only a narrow frequency band of light is diffracted into the orthogonal polarization and thus separated from the output beam by the output analyzer 15. This narrow passband is a function of the applied acoustical frequency and can therefore be varied by varying the frequency of excitation supplied by the signal generator 17.

This diffraction occurs as a cumulative effect for a very narrow band of optical frequencies, and is noncumulative by incremental self-cancellation for other frequencies. The cumulative diffraction effect occurs when the momentum vectors of the incident optical and acoustic waves satisfy the relation that their sum equals that of the output light beam. This condition is called phase matching. The narrow band of frequencies satisfying this relation and diffracted into the orthogonal polarization is then passed by the output analyzer; while the light of an optical frequency outside the narrow passband of the filter and thus of the initial polarization is blocked.

In the present filter, diffraction of light of one polarization into another by the acoustic wave will be particularly strong at a particular optical frequency for a particular acoustic frequency. For one acoustic frequency, the optical frequency that will be most strongly diffracted is determined by the amount of birefringence, $\Delta n$, of the crystal. The phenomena that makes it particularly strong is termed -phase matching- and occurs when the generated polarization wave travels at the same velocity as the free electromagnetic wave (a light wave propagating in the crystal in the absence of the acoustic wave).

When light of one polarization passes through the crystal, the acoustic wave mixes with it to generate what can be termed the travelling polarization wave which moves according to its momentum vector, which is the sum of the momentum vectors of the incident light and the acoustic wave. Now, if the birefringence of the crystal is chosen such that that polarization is moving at the same velocity that the free electromagnetic light wave travels, the diffraction process will be particularly strong.

On a macroscopic basis, a crystal is chosen with a certain birefringence, and by changing the acoustic frequency put in, the optical frequency which will most effectively be diffracted into the orthogonal polarization is also changed. So, broadly stated, the filter includes an input polarizer to establish polarization of the input light, a birefringent crystal with an acoustic wave in it, and an output polarizer turned perpendicular to the input polarizer so only that frequency which is particularly well diffracted will be passed by the output polarizer. And, when the acoustic frequency is changed, the bandpass of the filter is changed. The following is a detailed explanation of the theory of operation of the filter of the present invention.

The following is an explanation of the operation of the filter as it would apply for the case of LiNbO$_3$. Assume the input light beam to be an extraordinary wave polarized along the optic axis, Z, of the LiNbO$_3$ crystal. The output or diffracted optical beam will then be an ordinary wave polarized along the $x$ axis of the crystal. The acoustic wave which is necessary to accomplish the diffraction into the orthogonal polarization along $x$ is an $S_6$ shear wave generated at surface 23 of the crystal. The three waves are then taken as plane waves and are mathematically represented as:

$$\hat{E}_z(y, t) = \frac{E_z(y)}{2} \exp j(\omega_e t - k_e y)$$
$$+ \text{(input optical wave)} \frac{E_z^*(y)}{2} \exp -j(\omega_e t - k_e y) \quad (1a)$$

$$\hat{E}_x(y, t) = \frac{E_x(y)}{2} \exp j(\omega_0 t - k_0 y)$$
$$+\text{(output optical wave)} \frac{E_x^*(y)}{2} \exp -j(\omega_0 t - k_0 y) \quad (1b)$$

$$\hat{S}_6(y, t) = \frac{S_6(y)}{2} \exp j(\omega_a t - k_a y)$$
$$+ \text{(acoustic shear wave)} \frac{S_6^*(y)}{2} \exp -j(\omega_a t - k_a y) \quad (1c)$$

The quantities $\omega_e$, $\omega_0$, $\omega_a$, and $k_e$, $k_0$, $k_a$ are the angular frequencies and $\bar{k}$ vectors of the input optical wave, output optical wave, and acoustic wave, respectively. The symbol ^ denotes variables which have the complete time and spacial dependence, as opposed to the envelope variables $E_z(y)$, etc. The acoustic wave mixes with the input optical signal to produce forcing optical polarization waves at frequencies $\omega_e + \omega_a$, and $\omega_e - \omega_a$. These forcing waves propagate with $\bar{k}$ vectors of magnitude $k_e + k_a$ and $k_e - k_a$, respectively. Only if the $\bar{k}$ vector of this forcing wave is equal or nearly equal to that of the freely propagating electromagnetic light wave, will a cumulative interaction over many wavelengths take place. In LiNbO$_3$, the ordinary refractive index is greater than the extraordinary index, which for forward propagating waves requires phase matching such that $\bar{k}_e + \bar{k}_a = \bar{k}_0$; this, in turn, results in the frequency of the ordinary wave (the output frequency) being greater than that of the extraordinary wave (input frequency) by $\omega_a$.

The interaction between the acoustic and optical waves takes place as a result of the photoelastic effect. This effect is described as a perturbation of the elements of the impermeability tensor $b_{ij}$ such that $\Delta b_{ij} = p_{ijkl} S_{kl}$, where $P_{ijkl}$ are the components of the photoelastic tensor and $S_{kl}$ is the propagating strain wave. This perturbation of the impermeability tensor is equivalent to the creation of a driving polarization, which for this example can be shown to be given by $$P_x = -e_0 n_0^2 n_e^2 p_{41} S_6 \hat{E}_z$$
$$P_z = -e_0 n_0^2 n_e^2 p_{41} S_6 \hat{E}_x \quad (2)$$

where $e_0$ is the dielectric constant of free space and $n_0$ and $n_e$ are the refractive indices for the ordinary and extraordinary waves respectively. If eqs. (1) and (2) are substituted into the one-dimensional driven-wave equation for lossless media, i.e., $$\frac{\partial^2 \hat{E}}{\partial y^2} - \frac{1}{c^2} \frac{\partial^2 \hat{E}}{\partial t^2} = \mu_0 \frac{\partial^2 P}{\partial t^2} \quad (3)$$

and make use of the fact that $E_x(y)$ and $E_z(y)$ are slowly varying functions of $y$, then the following coupled complex equations are obtained $$\frac{dE_x}{dy} = j \frac{n_0 n_e^2 p_{41} \omega_0}{4c} S_6 E_z \exp(j\Delta k y)$$
$$\frac{dE_z}{dy} = j \frac{n_e n_0^2 p_{41} \omega_e}{4c} S_6^* E_x \exp(-j\Delta k y) \quad (4)$$

where there is defined a $k$ vector mismatch $\Delta k = k_0 - k_e - k_a$. In these equations, the acoustic wave is assumed to propagate losslessly and thus the acoustic strain $S_6$ is assumed to be independent of position in the crystal.

Equations (4) are now solved subject to the boundary condition that $E_x = 0$ and $E_z = E_z(0)$ at $y = 0$. The ratio of the output power at $y = L$, $P_x(L)$, to the input power at $y = 0$, $P_z(0)$ is found to be given by $$\frac{P_x(L)}{P_z(0)} = \left(\frac{\omega_0}{\omega_e}\right) \Gamma^2 L^2 \frac{\sin^2\left[\left(\Gamma^2 + \frac{\Delta k^2}{4}\right)^{1/2} L\right]}{\left(\Gamma^2 + \frac{\Delta k^2}{4}\right) L^2} \quad (5)$$

where $$\Gamma^2 = \frac{n_0^3 n_e^3 p_{41}^2 \omega_0 \omega_e |S_6|^2}{16 c^2}$$

It is noted that the frequency of the transmitted optical signal differs from that of the portion of the input signal with which it interacts by the acoustic frequency $\omega_a$. There is also an insignificant Manley-Rowe type power gain of magnitude $\omega_0/\omega_e$, which will be neglected in the following discussion.

The following is a discussion of transmittance, tuning rate, bandwidth, and aperture for the filter. From EQ. (5) it is is seen that the maximum transmittance of the filter will be attained when the input optical frequency is such that the momentum mismatch $\Delta k = 0$. For this condition, $$\frac{P_x(L)}{P_z(0)} = \sin^2 \Gamma L \quad (6)$$

and, for theoretical 100 percent peak transmittance, $L = \pi/2$. Expressing $|S_6|^2$ in terms of the acoustic power density $P_A/A$, $$\Gamma^2 = \frac{n_0^3 n_e^3 p_{41}^2 \pi^2}{2 \lambda_0^2} \frac{1}{\rho V^3} \frac{P_A}{A} \quad (7)$$

where $\lambda_0$ is the optical wavelength, $\rho$ is the density of the medium, $V$ is the acoustic velocity, $P_A$ is the total acoustic power, and $A$ is the area of the acoustic and optical beams.

For a 5-cm-long crystal of LiNbO$_3$ at a central transmission frequency of $\lambda_0 = 5000$ A; $p_{41} = 0.155$, $n_0 = 2.3$, $n_e = 2.2$, $\rho =$ 4.64 gm/cm³, $V = 4.0 \times 10^5$ cm/sec. An acoustic power density of 14 mw per mm² of filter aperture is therefore required for 100 percent peak transmittance.

With the acoustic power adjusted to provide peak transmittance at the center frequency ($\Gamma L = \pi/2$), the frequency response of the filter is determined by the variation of $\Delta k$ as the optical frequency is changed.

Let $$\Delta k = \left( \frac{\partial k_0}{\partial y} - \frac{\partial k_e}{\partial y} \right) \Delta y \qquad (8)$$
$$= b \Delta y$$

where $\Delta y$ is the change in wave numbers of the optical frequency from the center frequency of the filter. From Eq. (5), the optical-frequency-response function of the filter $H(f)$ may then be written $$H(f) = \pi^2 \frac{\sin^2 \frac{1}{2} (\pi^2 + b^2 L^2 \Delta y^2)^{1/2}}{\pi^2 + b^2 L^2 \Delta y^2} \qquad (9)$$

Figure 2:
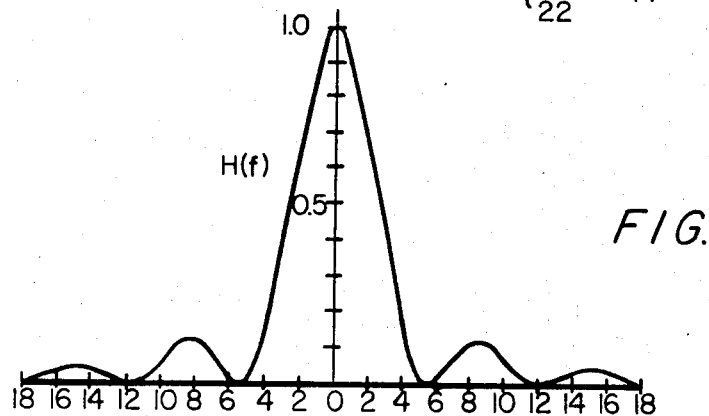
FIG. 2 is a graph depicting filter transmittance versus normalized frequency for a filter of the present invention.
Figure 3:
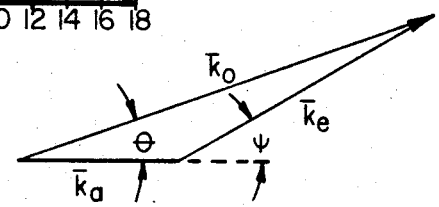
FIG. 3 is a vector diagram illustrating the non-collinear matched momentum condition for the pass band of operation of the filter of the present invention (not to scale).
Figure 4:
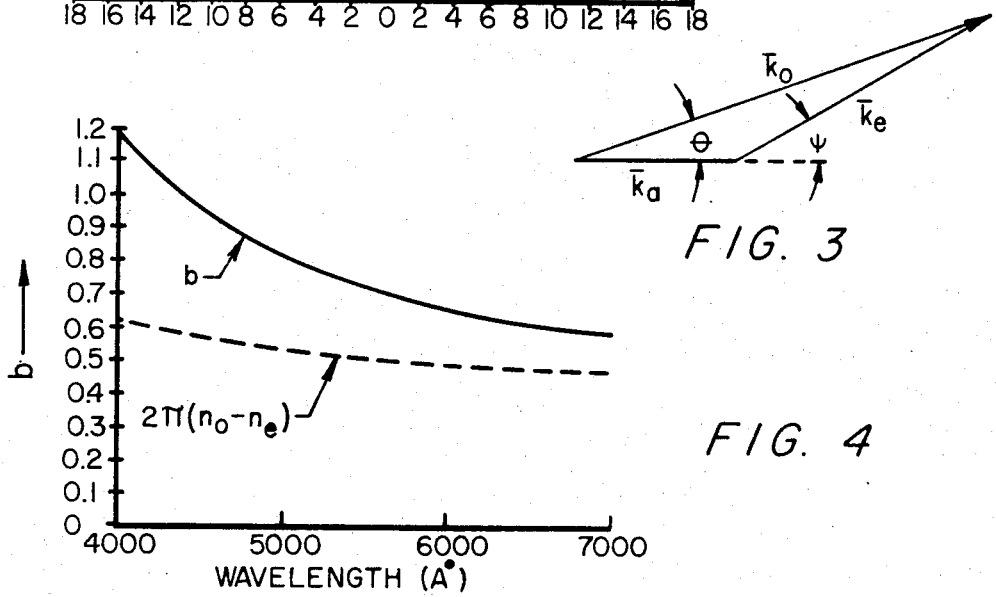
FIG. 4 is a graph of $b$ and $2\pi(n_o - n_e)$ versus wavelength for the filter of the present invention, where $b$ is the birefringence corrected for dispersion and $2\pi(n_o - n_e)$ represents the birefringence without dispersion.

FIG. 2 shows the transmittance $H(f)$ plotted versus the normalized frequency variable $bL\Delta y$. The half-peak transmittances of the primary lobe of the filter occur when $bL\Delta y \cong \pm 2.5$. For LiNbO₃, the constant $b$ may be obtained by differentiation of the Sellmeier equations of Hobden and Warner. (See M. V. Hobden and J. Warner, Phys. Rev. Letters 22, 243 (1966)). The result of this differentiation is given in FIG. 4, as a function of the optical wavelength, at a temperature of 200°C. This temperature was chosen because LiNbO₃ exhibits optical damage at temperatures lower than about 160°C. FIG. 4 shows that $b$ is somewhat larger than the value $2\pi(n_0 - n_e)$ that it would have in the absence of optical dispersion. The quantity $2\pi(n_0 - n_e)$ is also shown, in FIG. 4. For a 5-cm-long crystal of LiNbO₃ at 5,000 A, the total half-peak bandwidth of the first lobe of the filter ($\cong 5/bL$) is about 1.25 cm⁻¹ = 0.31 A.

Electronic tuning of the filter is accomplished by changing the frequency of the output of the electrical signal source 17 and the associated acoustic wave, thereby changing the length of its $\bar{k}$ vector. The acoustic frequency that will yield peak transmittance at an optical wavelength $\lambda_0$ is $$f_a = (V/\lambda_0)(n_0 - n_e) \qquad (10)$$

where $V$ is the acoustic velocity. For LiNbO₃ $V = 4 \times 10^5$ cm/sec and $n_0 - n_e$ may be obtained from FIG. 4. The necessary acoustic frequency for peak transmittance at 5,000 A is 680 Mc, and the region from 7,000 to 4,000 A can be tuned by changing the electrical and acoustic frequency from about 428 Mc to about 990 Mc. The rate of change of optical wave number per cycle change of the acoustic frequency is $\Delta y/\Delta f_a = 2\pi/bVA$, where b is defined in Eq. (8) is about 20 wave numbers per Mc change of the acoustic frequency. As the acoustic frequency is changed, the acoustic power should be varied inversely as the square of the acoustic frequency, if 100 percent peak filter transmittance is to be maintained [note eqs. (6), (7), and (10)].

The optical angular aperture of the filter at the input frequency corresponding to peak collinear transmittance is determined by $\bar{k}$ vector mismatch. The half-peak, half-angle aperture occurs when $\Delta kL \cong \lambda$. For nearly collinear propagation, we obtained from FIG. 4

$$\Delta k = k_0 \cos \phi - k_e \cos \psi - k_a$$
$$\cong k_0 - k_e - k_a + \left( k_e - \frac{k_e^2}{k_0} \right) \frac{\psi^2}{2} \qquad (11)$$
$$\cong \frac{\pi}{\lambda} \Delta n \psi^2$$

The half-angle aperture taken inside the crystal is then about $\psi = (\lambda/L\Delta n)^{1/2}$. This is magnified by refraction at the input of the crystal to yield a total aperture of about $2n_e (\lambda/L\Delta n)^{1/2}$. For a 5 cm crystal of LiNbO₃ at $\lambda = 5,000$ A, this yields a half-peak aperture external to the crystal of approximately 0.02 radians or 1.15°.

One way to view the operation of the filter of the present invention is to say that the acoustic wave travels through the crystal, on a microscopic basis, and distorts the crystal symmetry and thereby changes the birefringence in such a manner that the polarization of an incident linearly polarized light wave is changed or rotated to a polarization orthogonal to the incident beam. The $\bar{k}$ matching condition insures that this process will take place cumulatively over the full length of the crystal. To the extent that $\bar{k}$ matching is not there, it only takes place in an infinitesimal increment which is then cancelled by the next infinitesimal increment so that the process is not cumulative.

Two considerations are involved in selecting the orientation of the birefringent crystal. One is to have at least a reasonably large, effective photoelastic constant for diffraction from one polarization into the other. This has nothing to do with $\bar{k}$ matching. It is just a question of the size of the coefficient governing the diffraction process. It depends on the crystal tensor and the particular crystal class. For a given crystal, like lithium niobate, there are certain crystal orientations for which this photoelastic constant is larger than other crystal orientation. The above analysis shows that propagation along the Y axis in lithium niobate was a satisfactory choice of an effective crystal orientation.

The second consideration in choosing the crystal orientation relates to the adjustment of the birefringence. A given crystal class or given crystal like lithium niobate has a certain maximum birefringence. This maximum birefringence occurs when you propagate at 90° to the optic axis. For other directions of propagation in the crystal, the birefringence is smaller. So by picking an angle with respect to the optic axis, one could select the amount of birefringence. One chooses a particular birefringence for the acousto-optic filter because it is the birefringence that determines the acoustic frequency which will phase match with a given optical frequency. So, for instance, suppose one wants to work in the visible region of the spectrum, tuning optical frequency from red to blue. One would then like the acoustic frequency to lie in a reasonable range. One can then select this angle to adjust the birefringence to cause the acoustic frequency be in a comfortable region. For lithium niobate, it is found that the wave can propagate at 90° to the optic axis, using the full birefringence and this also turns out to be the angle of the largest photoelastic constant. So in this case, all of the numbers are particularly convenient in that the acoustic frequency lies in a convenient range and the photoelastic constant is large enough to be of practical interest. The birefringence is inversely related to the bandwidth, so that selection of the largest birefringence available will correspond to a narrow bandwidth, and, selection of smaller birefringence corresponds to wider bandwidths. The largest birefringence also implies the largest acoustic frequency as spelled out by equation 10.

The following is a discussion of tuning rate and bandwidth of operation. The parameter $b$ is a material parameter which combines birefringence with dispersion, the change of birefringence with wavelength. The tuning rate in units of optical wavenumbers per cycle change in acoustic frequency is given by $2\pi/bV$ where $b$ is defined in equation (8) and plotted in FIG. 4. It turns out that $b$ is not much different than $2\pi$ times the birefringence and that is why they are both plotted, so that one does not have to know his material in that detail to get an approximation of the value of $b$ by estimation of $2\pi(n_0 - n_e)$.

The bandwidth of this device is inversely proportional to both the quantity $b$ and the quantity $L$, where $L$ is the light path length of the nonlinear crystal. Referring to the $\sin^2 x/x^2$ curve of FIG. 2, one sees a plot of transmission versus $bL\Delta y$ where $y$ is in wave numbers. So for a particular crystal length, and a particular $b$, the bandwidth of the filter is defined in wave numbers. So in particular, we note making the crystal longer, narrows the range of $\Delta y$ over which the crystal will transmit. Then, as estimated from equation (9), a five centimeter crystal of lithium niobate has a total half peak power bandwidth of the first lobe of approximately $5/bL$ or about one-third of an Angstrom at a wavelength of 5,000 A.

For the present example, the most limiting factor of the present filter is the difficulty of obtaining large apertures. Since 14 mw of propagating acoustic power per mm² of crystal aperture is required, a 1-cm-square aperture needs an acoustic power of 1.4 watts. Broadband r-f to acoustic transducers can now be constructed with about 10 dB conversion loss, thus requiring an r-f power of 14 watts.

The present analysis has neglected the acoustic attenuation that occurs as the acoustic wave propagates down the crystal. At room temperature, this attenuation should be about 0.75 dB/cm at 1,000 Mc; and should vary approximately as the square of the acoustic frequency. Its effect will be equivalent to shortening the crystal and will thus lead to somewhat larger bandwidths and necessitate somewhat higher acoustic drive powers.

$LiNbO_3$ and the filter configuration of FIG. 1 are only one of a number of possible crystals and configurations that could be employed. The advantage of this configuration is that it allows the acoustic wave to be brought in at right angles to the light, and thus does not require the light to pass through an acoustic transducer. A disadvantage is that for shear-wave propagation down the $y$ axis there is an approximately 7° divergence between the direction of the acoustic power flow and the acoustic $\bar{k}$ vector. This requires that the filter aperture be at least one part in 10 of the crystal length. However, other crystal orientations allow diffraction into the orthogonal polarization and do not exhibit this divergence. For example, collinear propagation of a longitudinal acoustic wave and the optical signal down the $x$ axis of a $LiNbO_3$ crystal accomplishes the desired result.

Two other materials that may be useful for this type of filter are sapphire and quartz, which have the same photoelastic tensor as does $LiNbO_3$. The birefringence of both of these materials is about one-tenth that of $LiNbO_3$. As a result, the necessary acoustic frequencies would be centered about 70 Mc instead of 700 Mc as in the $LiNbO_3$ filter. Both the tuning rate and also the bandwidth of these filters (for the same crystal length) would be about ten times as large as that of the $LiNbO_3$ filter. The angular aperture would be about three times as large as that of a $LiNbO_3$ filter of the same length. As a result of the lower refractive indices of these crystals, about 10 to 20 times as much acoustic power would probably be required to obtain the theoretical 100 percent peak transmittance. However, this might be off-set by use of longer crystals.

Figure 5:
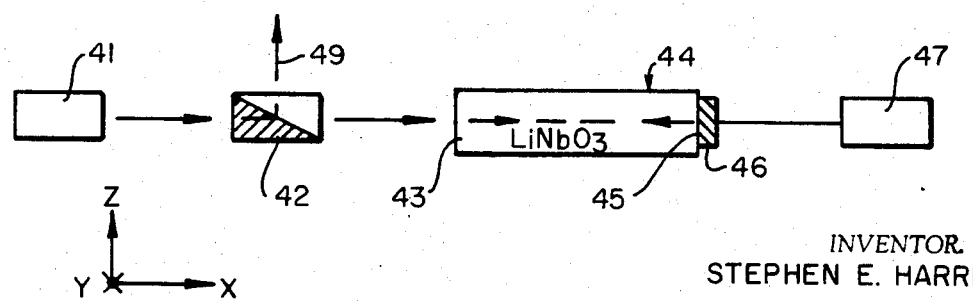
FIG. 5 is a schematic representation of another embodiment of the invention.

Referring to FIG. 5, another embodiment of the invention is shown and consists of a source of light 41 providing an output light beam which is passed through a polarizing prism 42 as, for example, of the Rochon type, which also serves as an output analyzer for light of orthogonal polarization which is travelling in the opposite direction. The polarized light output of prism 42 is then passed back and forth through a birefringent crystal 44, such as $LiNbO_3$. Crystal 44 is provided with end faces 43 and 45 which are plane parallel, face 43 serving as an input surface for admitting light received from prism 42. Face 45 is provided with a reflective coating so that light traversing the crystal is reflected by the surface 45 and passed back toward the source through surface 43.

An electro-acoustical transducer 46 is coupled to reflective surface 45 and is connected to a suitable signal generator or source 47 of electric signals as in the device of FIG. 1 which is tunable, for example, from 750 to 1,050 MHz. The acoustic output of the transducer is coupled to the crystal and sets up acoustic waves. These waves can couple to an acoustic resonance resulting from making the end faces plane parallel. By using the acoustic resonance of the crystal, the amount of acoustic driving power required for operation can be reduced.

The operation of the device of FIG. 5 is similar to that of FIG. 1 except that the polarizing prism 42 serves also as an analyzer. Thus, input electromagnetic waves are linearly polarized (in a plane perpendicular to plane of drawing) by the prism before entering the crystal 44 and if undiffracted will remain so polarized after reflection off of surface 45 and passing back through the crystal. Such reflected waves will be transmitted by prism 42. The narrow band of wavelengths which are phase matched and rotated into the orthogonal polarization will be separated out by the prism 42 and reflected to form an output beam 49.

An alternative configuration is to make the input surface of the crystal inclined at an angle to the direction of wave propagation between the faces to thereby present an inside surface to reflect impinging acoustic waves off at an angle. In that case, an acoustic load would be coupled to the side of the crystal in a position to receive and absorb acoustic waves reflected from the inside of the input surface and the entire crystal would be set at an angle to the input light beam so as to compensate for refraction.

Figure 6:
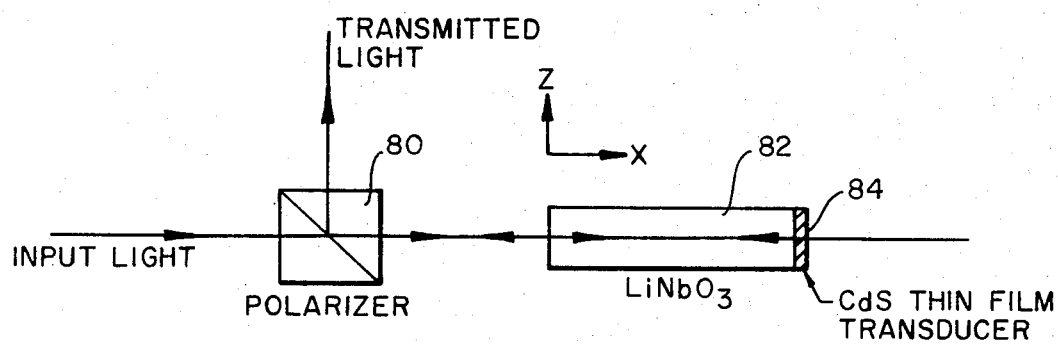
FIG. 6 is a schematic representation of one experimental optical filter construction in accordance with the present invention.
Figure 7:
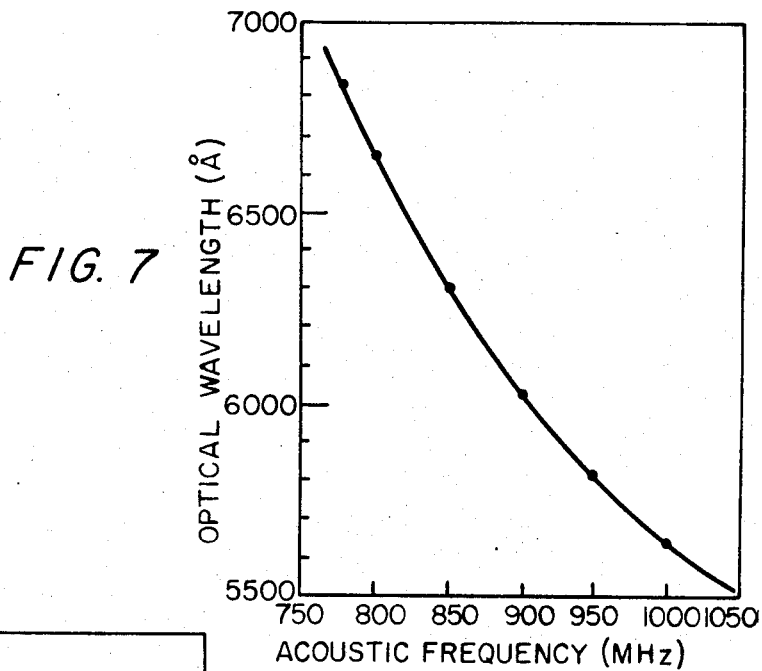
FIG. 7 is a graph showing the tuning curve of the filter of FIG. 6.
Figure 8:
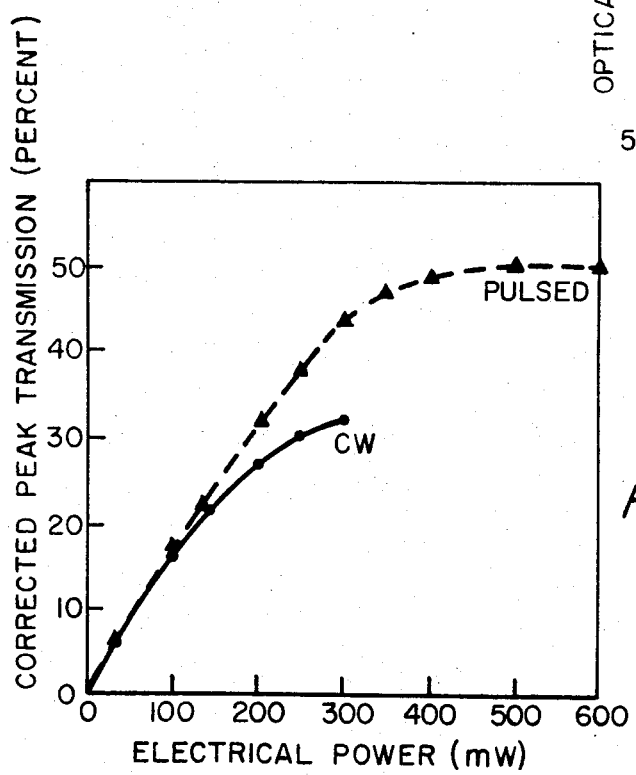
FIG. 8 is a graph showing corrected peak transmission versus electrical power input for the filter of FIG. 6.

Referring to FIGS. 6–8, there is shown an experimental example of an optical filter of the present invention in which tuning from 7,000 to 5,500 A has been obtained by changing the acoustic frequency from 750 to 1,050 MHz. A band pass of less than 2 A, a corrected peak transmission of 50 percent, and an average skirt rejection ratio of about 45 dB have been obtained.

In the filter configuration described here, and shown in FIG. 6, linearly polarized light from an input output analyzer 80 is normally incident on a 1.8-cm-long crystal 82 of 90° cut $LiNbO_3$, and propagates collinearly with a longitudinal acoustic standing wave induced by acoustic transducer 84, along the $x$ axis of the crystal. The incident light may be polarized along either the $y$ or $z$ axes. Diffraction into the orthogonal polarization occurs via the $p_{41}$ photoelastic constant, and is only cumulative if $|k_o| - |k_e| = |k_a|$, where the subscripts $o$, $e$, and $a$ denote the ordinary and extraordinary optical waves, and the acoustic wave respectively. This will be the case if the optical and acoustic frequencies $f_o$ and $f_a$ are related by $$f_0 = \frac{c}{V} \frac{1}{|\Delta n|} f_a \qquad (12)$$

where $c/V$ is the ratio of the optical velocity in vacuum to the acoustic velocity in the media, and $\Delta n$ is the birefringence of the crystal. For $LiNbO_3$ for the orientation shown, $V \cong 6.57 \times 10^5$ and $\Delta n \cong 0.09$; and thus $f_o \cong 5.1(10^5) f_a$.

The pass band of this type of filter is of the form $\sin^2 x/x^2$, and has a half-power width determined by the condition $|\Delta k L'| \cong 2\pi$, where $L'$ is the total (round-trip) interaction length of the optical and acoustic fields. Neglecting the dispersion of the refractive indices, this gives a half-power bandwidth of about $$BW \cong \frac{1}{2|\Delta n|L} \text{ cm.}^{-1} \qquad (13)$$

where $L$ is the length of the $LiNbO_3$ crystal. This gives a theoretical bandwidth of about 3.1 cm$^{-1}$ or about 1.1 A at 6,000 A. It should be noted that no secondary or higher-order pass bands are present.

The $LiNbO_3$ crystal 82 was polished flat and parallel in order to enhance the longitudinal acoustic resonances which occured every 0.18 Mc/sec. From Eq. 12 this corresponds to an optical frequency spacing of about 3 cm$^{-1}$, which from Eq. 13 is about equal to the theoretical resolution of the filter. The width of the acoustic resonances was about 0.03 Mc/sec. yielding an acoustic finesse of 6. The CdS thin film transducer had an area of 1.8 mm² and was centered at about 864 MHz (corresponding to 6,328 A). It had a half-power tuned bandwidth of about 15 percent, and a 17-dB electrical-to-acoustical conversion loss at 864 MHz.

The experimental tuning curve of the filter is shown in FIG. 7 and was obtained using a mercury arc light source and Beck reversion spectroscope. Further tuning was limited by the bandwidth of the CdS transducer. The resolution over this range was sufficient to just resolve the successive acoustic resonances (3 cm$^{-1}$ apart). The average rejection ratio against frequencies outside of the pass band was 45 dB, and is a measure of the extent to which the crystal is strain free. The half-power angular aperture was estimated to be about 0.03 rad.

Peak filter transmission was measured using a He-Ne laser, and results are shown in FIG. 8. The data shown are corrected for optical losses experienced at the crystal input face and at the acoustic transducer. The reflection coefficients of these surfaces were 15 and 58 percent, respectively. It is seen that at about 500 mW of electrical input power corrected transmission has saturated at 50 percent. This maximum results because of additional conversion to sidebands which have the same polarization as that of the input signal; and also possible as a result of thermal effects. As a result of crystal heating, the maximum corrected cw transmission was limited to about 30 percent.

Thus, there has been provided a new and useful tunable optic filter of narrow, controllable bandwidth. A particular advantage of the filter is its direct response to an applied electric signal from a commonly available signal generator. Such signal generators are capable of rapid, swept output to give the present filter instantaneous frequency scanning potential as opposed to the relatively slow action of mechanically rotated filter wheels. In the future this filter can be used as tunable YIG filters are now used in microwave work, and as the laser becomes more versatile and tunable, many applications of this filter are expected. A further application lies in its use as a monochromator or spectrometer which its potentially small size and ease of construction are of benefit.

Further, as regards the acoustic transducer 23 or 46, many of the various types of suitable acoustic-optic crystal materials are piezoelectric, such as quartz and lithium niobate, therefore, the acoustic waves can be excited directly in the crystal by electrodes, without the need of a separate acoustic transducer coupled to the birefringent medium, 12 or 44.

As regards the light source 11 or 41, it is desirable, for certain embodiments of the present invention, that the light source be broadband relative to the instantaneous bandwidth of the light shifted from one polarization to an orthogonal polarization. Thus, in a sense, the term "broadband" as employed to characterize the light source means broader than the instantaneous optical passband of the acoustic-optic device. However, light sources are readily available providing octaves of optical bandwidth in the visible and invisible bands. Thus, in the latter sense a broadband light source can be considered as a light source having an optical bandwidth in excess of 10 percent.

As used herein, "light" is defined to mean electromagnetic radiation. Such light may not be confined to the visible spectrum. Likewise, "optical" need not be confined to the visible spectrum.

The benefits of collinear diffraction are: (1) the stringent angular tolerance characteristic of Bragg diffraction is relaxed. (2) the interaction volume of the acoustic and optical beams is enhanced because of the collinear propagation; therefore, the efficiency of light conversion can be increased to nearly 100 percent and the acoustic power required for efficient conversion drastically decreased.

In some birefringent crystals the acoustic phase velocity $k$ vector and the group velocity are not collinear. The angle between them may be as much as 20°, as in the case of quartz. In such a case, the light beam may be collinear with either the phase or the group velocity with corresponding advantages and disadvantages.

If the light beam is collinear with the phase velocity, the advantage of slow dependence of bandwidth center frequency upon divergence is retained with the disadvantage that the light beam soon walks out of the acoustic beam because energy propagates in the direction of the group velocity and is not collinear with the light beam. Thus, narrow band characteristics can be obtained in this case at the expense of either larger acoustic aperture or higher acoustic power.

On the other hand, if the light beam is made collinear with the group velocity, the advantage of efficient utilization of acoustic energy is retained but the angle between the acoustic $k$ vector and the optical $k$ vector is no longer zero and the shift in the center of the optical passband with divergence in the optical beam is a more rapid function. In intermediate cases where propagation is neither exactly collinear with either the phase or the group velocity, corresponding tradeoffs occur. In those birefringent crystals in which the phase velocity and group velocity are collinear, non-collinear propagation of light in the filter contributes similar deleterious effects to the filter. Therefore, as used herein, substantially collinear means that the light and acoustic $k$ vectors are sufficiently collinear to retain the advantages of efficient acoustic power utilization consistent with the required passband filter characteristics.

The bandwidth of the acoustic-optic filter is inversely related to the length of the interaction path $L$ through the crystal. In resonant acoustic-optic filters the path length can be relatively short and, thus, the bandwidth is relatively wide. In such cases the $k$ vectors for the optical and acoustic waves can have substantial divergence while still retaining the benefits of collinear diffraction.

The collinearly propagating optical and acoustic waves have been described as travelling in the same direction. However, the filter will also operate if they travel in opposite directions. Let us examine the case of LiNbO$_3$ where the ordinary optical index is greater than the extraordinary optical index. Further assume that the acoustic and optical waves travel in the same direction. First, assume that the incident optical wave is an extraordinary wave. In this case the $\bar{k}$ vector condition $\bar{k}_e + \bar{k}_a = \bar{k}_o$ will be satisfied. In this case the light will also be up-shifted by the acoustic frequency $\omega_a$. Alternatively, consider the case where the incident optical wave is an ordinary wave; and again, the acoustic and optical waves travel in the same direction. In this case the condition $\bar{k}_e + \bar{k}_a = \bar{k}_o$ will again be satisfied, but in this case the incident optical signal will be down-shifted by the acoustic frequency $\omega_a$.

Consider next the two remaining cases. First, let the optical signal be an extraordinary wave but let the acoustic wave travel in the opposite direction to the optical wave. In this case, the vector condition $\bar{k}_e - \bar{k}_a = \bar{k}_o$ will be satisfied and the acoustic wave will be down-shifted in frequency. Finally, consider the case where the incident optical wave is an ordinary wave and the acoustic wave travels in the opposite direction to the optical wave. Now, the vector condition $\bar{k}_e - \bar{k}_a = \bar{k}_o$ will again be satisfied, but this case the incident optical signal will be up-shifted in frequency.

Thus, in general, the necessary $\bar{k}$ vector matching condition will be of the form $\bar{k}_e \pm \bar{k}_a = \bar{k}_o$, where the ± sign is determined by both the relative direction of optical propagation and acoustic propagation; and also on whether the extraordinary index is greater than or less than the ordinary index.

I claim:

1. In an acousto-optic apparatus for diffracting light of a first polarization and first bandwidth into light of a second polarization including, optically birefringent medium means disposed to receive a beam of light having a first optical bandwidth and to be diffracted from a first polarization into a second polarization, means for exciting an acoustic wave in said optically birefringent medium at a frequency related to the optical frequency of the light to be diffracted from the first to the second polarization, such acoustic wave having a path of propagation within said optically birefringent medium which is substantially collinear with the optical beam path for cumulatively collinearly diffracting the light beam on the acoustic wave within the optically birefringent medium to selectively diffract light of the first polarization, and within a second instantaneous passband of optical frequencies narrower than said first bandwidth and related to the frequency of the acoustic wave, into light of the second polarization, and means for developing said light beam to be diffracted with said first optical bandwidth wider than said second narrower instantaneous passband.

2. The apparatus of claim 1 including, means for analyzing the diffracted light beam to separate light of one of said polarizations from the light of the other of said polarizations.

3. The apparatus of claim 1 including, means for varying the frequency of the acoustic wave within said optically birefringent medium over a band of acoustic frequencies to tune the second instantaneous passband of optical frequencies over an optical bandwidth.

4. The apparatus of claim 1 including, means for linearly polarizing the light beam to be diffracted in the direction of the first polarization.

5. The apparatus of claim 1 wherein said optically birefringent medium means is disposed to receive the beam of light to be diffracted with a light beam path through said medium such that the light beam enters said medium at one side, traverses a beam path within said medium, and emerges from said medium as a diffracted light beam on a side of said medium opposite the side of light beam entry.

6. The apparatus of claim 1 wherein said means for exciting an acoustic wave in said optically birefringent medium includes, acoustic transducer means coupled to said optically birefringent medium means for directing an excited acoustic wave into the medium at such an angle as to be deflected at a boundary of said optically birefringent medium from a path which is inclined to the optical beam path into a path which is generally collinear with the optical beam path within said optically birefringent medium.

7. The apparatus of claim 1 wherein said means for developing said light beam of first polarization and first bandwidth develops said light beam as a beam of incoherent light.

8. In a acousto-optic apparatus for diffracting light of a first polarization into light of a second polarization including, optically birefringent medium means disposed to receive a beam of light to be diffracted from a first polarization into a second polarization such beam of light having a beam path through said medium such that the light beam enters the medium at one side, traverses a beam path within the medium, and emerges from the medium as a diffracted light beam on a side of the medium opposite to the side of light beam entry, means for exciting an acoustic wave in said optically birefringent medium at a frequency related to the optical frequency of the light to be diffracted from the first to the second polarization, such acoustic wave having a path of propagation within said optically birefringent medium which is substantially collinear with a substantial component of the optical beam path for cumulatively collinearly diffracting the light beam on the acoustic wave within the optically birefringent medium to diffract light of the first polarization and of an optical frequency related to the frequency of the acoustic wave into light of the second polarization.

9. The apparatus of claim 8 including, means for analyzing the diffracted light beam to separate light of one of said polarizations from light of the other of said polarizations.

10. The apparatus of claim 8 including means for varying the frequency of the acoustic wave in said optically birefringent medium to vary the optical frequency of the light diffracted from the first polarization into the second polarization.

11. The apparatus of claim 8 including, means for developing said light beam to be diffracted with an optical bandwidth wider than the instantaneous passband of the light which is diffracted from the first polarization to the second polarization.

12. The apparatus of claim 8 including, acoustic transducer means for exciting and directing the acoustic wave into said optically birefringent medium at such an angle as to be deflected at a boundary of said optically birefringent medium from a path which is inclined to the optical beam path into a path which is generally collinear with the optical beam path within said optically birefringent medium.

13. The apparatus of claim 8 wherein said birefringent medium means is a birefringent crystal.

14. The apparatus of claim 29 including, means for linearly polarizing the incident light beam in the direction of the first polarization.

15. In an acousto-optic apparatus, a light beam of a first polarization and bandwidth which is to have only a portion of its total bandwith diffracted into light of a second polarization, optically birefringent medium means disposed to receive the beam of light having a first optical bandwidth and to be diffracted from a first polarization into a second polarization, means for exciting an acoustic wave in said optically birefringent medium at a frequency related to the optical frequency of that portion of the bandwidth of the light to be diffracted from the first to the second polarization, such acoustic wave having a path of propagation within said optically birefringent medium which is substantially collinear with a substantial component of the optical beam path within said birefringent medium for cumulatively collinearly diffracting the light beam on the acoustic wave within the optically anisotropic medium to diffract light of the first polarization, and within a second instantaneous passband of optical frequencies narrower than said first bandwidth of light and related to the frequency of the acoustic wave, into light of the second polarization, means for varying the frequency of the acoustic wave within said optically birefringent medium over a band of acoustic frequencies having a bandwidth in excess of 10 percent to tune the second instantaneous passband of optical frequencies for light diffracted from the first polarization to the second polarization over a comparable optical bandwidth in excess of 10 percent.

16. The apparatus of claim 15 wherein said means for varying the frequency of the acoustic wave includes an acoustic transducer means having a bandwidth in excess of 10 percent for exciting acoustic waves over a relatively wide band of acoustic frequencies.

17. The apparatus of claim 15 wherein said means for varying the frequency of the acoustic wave over a band of acoustic frequencies includes, tunable radio frequency generator means for generating an electrical signal tunable over a band of frequencies as wide as the band of acoustic frequencies to be generated within said optically birefringent medium, and acoustic transducer means responsive to the tunable electric signal for exciting the acoustic waves to be excited in said birefringent medium means.

18. The apparatus of claim 15 including, means for developing said light beam to be diffracted with said first optical bandwidth wider than said second instantaneous passband of light which is diffracted from the first polarization to the second polarization.

19. The apparatus of claim 15 including, means for analyzing the diffracted light beam to separate light of one of said polarizations from light of other of the said polarizations.

20. The apparatus of claim 15 wherein said light beam of first polarization is a beam of incoherent light.

21. An acousto-optic apparatus comprising, means for developing a first light beam having a first band of frequencies with a predetermined polarization, an anisotropic crystal disposed to receive said beam, said crystal being selected and arranged to propogate said light beam as a particular wave in a birefringent system, said crystal being further capable of diffracting and propagating a second light beam with a second band of frequencies within said first band and being of orthogonal polarization to said first beam, as another wave of said birefringent system in response to acoustical waves in the medium, means coupled to said crystal for developing acoustical waves of predetermined frequency in said anisotropic crystal, the frequency of said acoustical wave being selected to define a phase-matched relationship with said first light beam such that the vector sum of the momentum vectors of said second band of frequencies narrower than and within said first band of frequencies of the incident light beam and the acoustical wave are equal to that of said second light beam orthogonally oriented to said input light beam, whereby said second narrower band of frequencies of said incident light beam satisfying said phase-matched relationship for a given acoustical wave frequency is diffracted into said orthogonal polarization, and an output analyzer aligned to selectively pass the light waves orthogonally related to the polarization of said input light beam.

22. An acousto-optic apparatus as in claim 21 in which said crystal is provided with end faces forming an acoustic resonator, a reflective surface carried on one of said end faces for internally reflecting light waves from within said crystal.

23. An acousto-optic apparatus as in claim 21 in which said crystal has a pair of end faces, one of said end faces being constructed and arranged to admit said first light beam into said crystal, light reflective means being provided at said other end face for internally reflecting light impinging thereon.

24. An acousto-optic apparatus as in claim 22 wherein said means for developing acoustical waves is coupled to said end face having said light reflective means.

25. The apparatus of claim 21 wherein said means for developing said first light beam develops a first light beam as a beam of incoherent light.

26. An acousto-optic apparatus including a first light beam having a first band of frequencies and predetermined polarization, an anisotropic crystal medium disposed to receive said first light beam, said crystal being selected and arranged to propagate said first light beam as a particular wave in a birefringent system, said crystal being further capable of diffracting and propagating a second light beam having a second band of frequencies within and narrower than said first band of frequencies at orthogonal polarization to said first beam as another wave of said birefringent system in response to acoustical waves, means coupled to said medium for developing acoustical waves of predetermined frequency in said anisotropic medium, the frequency of said acoustical waves being selected to define a phase-matched relationship such that the vector sum of the momentum vectors of said second narrower band of frequencies of said incident light beam and the acoustical wave are equal to that of said second band of frequencies of said second light beam orthogonally oriented to said first input light beam, whereby said second band of frequencies of said incident light beam satisfying said phase-matched relationship for the given acoustical wave frequencies are diffracted into said orthogonal polarization.

27. The apparatus of claim 26 wherein said first light beam is a beam of incoherent light.

28. An optical filter for deriving a narrower band of frequencies from a light beam having a first band of frequencies comprising, means for developing an input light beam having a first band of optical frequencies and having a predetermined first polarization, an optically anisotropic medium disposed to receive said light beam, said medium being selected and arranged to propagate said light beam as particular light waves in a birefringent system, said medium being further capable of diffracting and propogating a second band of optical frequencies narrower than and within said first band of optical frequencies, of orthogonal polarization to said first band as another wave of said birefringent system, in response to an acoustical wave in said medium, means coupled to said medium for developing acoustical waves of predetermined frequency in said anisotropic medium, the predetermined frequency of said acoustical waves being selected to define a phase-matched relationship such that the vector sum of certain momentum vectors of the incident light beam and the acoustical wave are substantially equal to the momentum vector of said second narrower band of light waves, whereby said second narrower band of optical frequencies of the incident light beam satisfying said momentum vector condition for a given acoustical wave frequency is diffracted into said orthogonal polarization to provide said second narrower band of optical frequencies, an output analyzer aligned to analyze the light waves orthogonally related to the first polarization of said input light beam, and means for varying the frequency of the acoustical waves to vary the frequency of said second narrower band of the light waves being diffracted into said orthogonal polarization.

29. An optical filter as in claim 28 wherein said means for developing an acoustical wave includes an electro-acoustical transducer, means coupling an acoustical output of said transducer to said anisotropic medium and wherein said means for varying the frequency of the acoustical waves includes a source of time varying electrical signals coupled to said transducer to drive same, said source including means for varying the frequency content of the output electrical signals delivered to said transducer.

30. An optical filter as in claim 28 wherein said anisotropic medium is a crystal of lithium niobate.

31. Optical filters as in claim 30 wherein said crystal of lithium niobate is oriented to propagate the input broad band light beam as an extraordinary wave along the axis of said crystal, the diffracted wave being an ordinary narrower band wave along the axis, the momentum vectors of said waves satisfying the condition $\bar{k}_e + \bar{k}_a = \bar{k}_o$, where $\bar{k}_e$ is the momentum vector of said narrower band of the extraordinary wave, $\bar{k}_a$ is the momentum vector of he acoustic wave and $\bar{k}_o$ is the momentum vector of the narrower band ordinary wave.

32. An optical filter as in claim 30 wherein said crystal is provided with a face inclined at an angle to said input light beam and against which the acoustic waves are directed to reflect from the inside of said inclined face to travel collinearly with said input light beam.

33. An optical filter as in claim 32 wherein said acoustical waves are initially longitudinal, and are converted into shear waves by reflection from said surface.

34. An optical filter as in claim 28 in which said narrower band output light beam and acoustic wave propagate collinearly through said anisotropic medium.

35. Optical filter as in claim 28 wherein said anisotropic medium is a birefringent crystal.

36. An optical filter as in claim 28 wherein said medium is a birefringent crystal having an input inclined face and a reflective surface at opposite ends.

37. An optical filter as in claim 36 in which said means for developing acoustical waves is coupled to said reflective surface.

38. The apparatus of claim 28 wherein said means for developing said input light beam comprises means for developing an incoherent input light beam.

39. An optical filter comprising, a light beam having a first band of frequencies polarized in a first polarization orientation direction, an isotropic medium disposed to receive said beam, said medium being selected and arranged to propagate said light beam as particular waves having said first polarization orientation in a birefringent system, said medium being further capable of diffracting and propagating a light beam with a second band of frequencies narrower than and within said first band and polarized in a second polarization orientation different from said first beam as another wave of said birefringent system in response to acoustical waves, means coupled to said medium for developing an acoustical wave of predetermined frequency in said anisotropic medium, the frequency of said acoustical wave being selected to define a matched relationship such that the vector sum of the momentum vectors of the narrower second band of frequencies within and of said first band of frequencies of the incident light beam and the acoustical wave are equal to that of the narrower frequency band of light oriented at said second polarization, whereby said narrower second band of said incident light beam satisfying said matched relationship for a given acoustical wave frequency is diffracted into said second polarization orientation, an output analyzer aligned to analyze the light waves of said second polarization, and means for varying the frequency of the acoustical wave to vary the frequency of light waves being diffracted into said second polarization orientation.

40. An optical filter as in claim 39 in which said first polarization orientation is linear in a predetermined direction, and in which said second polarization orientation is linear in a direction orthogonal to the first.

41. The apparatus of claim 39 wherein said light beam of first bandwidth and first polarization is a beam of incoherent light.

42. In an acousto-optic method the steps of, exciting an acoustic wave in an optically birefringent medium selected and arranged to propagate light of a first polarization and of a first bandwidth as particular waves in the medium cumulatively and substantially collinearly diffracting said light of said first polarization and first bandwidth on the acoustic wave within the optically birefringent medium to selectively cumulatively diffract only a narrower instantaneous bandwidth portion of said first band of frequencies of said light of said first polarization into light of said second polarization.

43. The method of claim 42 including the step of analyzing the diffracted light beam to separate light of one of said polarizations from light of the other of said polarizations.

44. The method of claim 42 including the steps of varying the frequency of the acoustic wave in the optically birefringent medium to vary the center frequency of the narrower band of optical frequencies cumulatively diffracted to the second polarization within the wider bandwidth of light of the first polarization.

45. The method of claim 42 wherein the step of collinearly diffracting the light beam on the acoustic wave includes the step of directing the light beam to the diffracted through the optically birefringent medium such that the light beam to be diffracted passes into the birefringent medium on one side thereof and the diffracted light beam emerges from the medium at a side opposite to the first side.

46. The method as in claim 45 including the steps of analyzing the light beam which emerges from the medium at the side opposite the first side to separate light of one of said polarizations from light of the other of said polarizations.

47. The method of claim 42 wherein said light of first polarization which is selectively cumulatively collinearly diffracted on the acoustic wave into light of said second polarization is incoherent light.

48. In an acousto-optic method for selectively diffracting only a portion of the bandwidth of light of a first polarization into light of a second polarization the steps of, exciting an acoustic wave in an optically birefringent medium selected and arranged to propagate light as a particular wave in the birefringent medium, such acoustic wave being of an acoustic frequency related to the optical frequency of the portion of the bandwidth of the light to be diffracted from the first to the second polarization, and cumulatively and substantially collinearly diffracting a beam of light having a first optical bandwidth and the first polarization on the acoustic wave within the optically birefringent medium to selectively cumulatively diffract light of the first polarization and substantially only within an instantaneous optical passband less than said first bandwidth into light of said second polarization.

49. The method of claim 48 including the step of analyzing the diffracted light beam to separate light of one of said polarizations from light of the other of said polarizations.

50. The method of claim 48, including the step of varying the frequency of the acoustic wave in the optically birefringent medium to vary the center frequency of the instantaneous passband of optical frequencies cumulatively diffracted to the second polarization within said wider first optical bandwidth of light to be diffracted.

51. The method of claim 48 including the step of linearly polarizing the light beam to be diffracted in the direction of the first polarization.

52. The method of claim 48 wherein the step of collinearly diffracting the light beam on the acoustic wave includes the step of, directing the light beam to be diffracted through the optically birefringent medium such that the light beam to be diffracted passes into the birefringent medium on one side thereof and the diffracted light beam emerges from the medium at a side opposite the first side.

53. The method of claim 48 including the step of directing the excited acoustic wave relative to the medium at such an angle as to be deflected at a boundary of the medium from a path which is inclined to the optical beam path into a path which is generally collinear with the optical beam path within the optically birefringent medium.

54. The method of claim 48 wherein the light of first polarization which is diffracted into the second polarization is incoherent light.

* * * * *